July 17, 1928.

E. W. HORTON ET AL

GAS OUTLET

Filed July 2, 1926

1,677,634

Inventors
E. W. Horton
Horace G. Richardson
By Horace C. Chandler
Attorney

Patented July 17, 1928.

1,677,634

UNITED STATES PATENT OFFICE.

EDGAR W. HORTON AND HORACE G. RICHARDSON, OF SAN ANTONIO, TEXAS.

GAS OUTLET.

Application filed July 2, 1926. Serial No. 120,094.

This invention relates to new and useful improvements in gas jets, and particularly to connections thereof with the gas piping of a house.

One object of the invention is to provide a device of this character which is concealed within a wall so that access is not easy, thereby effectively preventing children from turning on the gas, at the jet, and leaving the same in such condition.

Another object is to provide a device of this character which includes an automatic valve operable into open position, when the jet is in position, and which will assume a closed position when the jet is removed.

Other objects and advantages will be apparent from the following description when taken in connection with the accompanying drawing.

Figure 1:
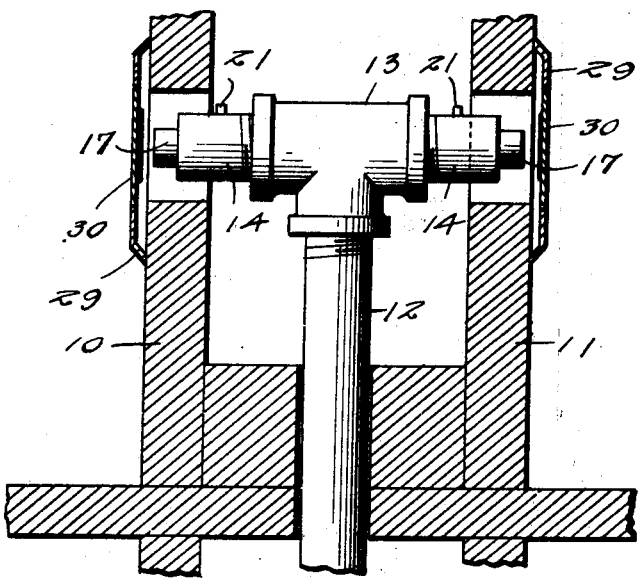
Figure 1 is a vertical sectional view through a wall, showing the invention in position, with the nipple, or jet removed.
Figure 2:
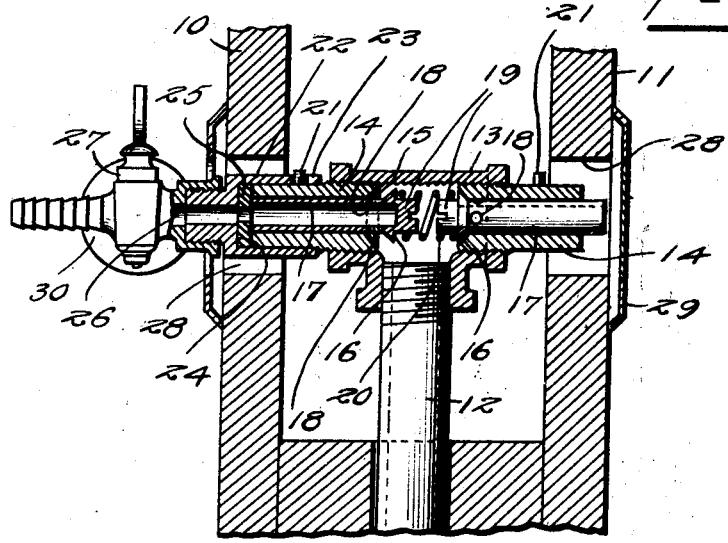
Figure 2 is a similar sectional view, but extending through the invention, with the nipple, or jet applied.

Referring particularly to the accompanying drawing, 10 and 11 represent the walls of two adjoining rooms, between which is disposed the vertical gas conveying pipe 12. On the upper end of the pipe 12 is a T-joint 13, each of the branches of which is internally threaded. Into one of the horizontal branches of the T is screwed an end of a longitudinally bored plug 14, the inner end of which is provided with a ground seat 15, against which is seated the valve head 16 carried by the stem 17. The stem is hollow, as shown in the sectional view, and opens through the outer end thereof, but is closed at the valve head, where it is provided with a plurality of laterally directed openings 18, to permit the passage of gas from the T thereinto, and through the outer end of the stem. The valve head is formed with a reduced extension 19, about which is encircled the adjacent end of a coil spring 20. Projecting from the side face of the plug 14 is a pin 21, and slipped onto the plug is a sleeve 22, said sleeve having a bayonet slot 23 for the reception of said pin and whereby said sleeve is held on the plug. In the outer end of the sleeve there is formed a ledge 24, on which is disposed a washer 25, which washer bears against the outer open end of the valve stem, whereby to urge the same inwardly, when the sleeve is properly engaged on the plug, and the pin is seated in the inner end of the bayonet slot. The valve is thus unseated, against the force of the spring 20, while at the same time gas is prevented from escaping around the outer end of the stem, and forced to pass into the nipple 26, which is screwed onto the outer end of the sleeve. This nipple, or jet, is provided with the ordinary gas cock 27, while the nipple portion is adapted to receive thereon one of the rubber ends of a gas hose which is connected to some appliance, such as a gas lamp, or a gas heating stove. In each of the walls 10 and 11, opposite the ends of the T-joint, there is formed an opening 28, and on the outer face of each wall is a face plate 29, having a hinged door 30, adapted to be opened to give access to the plug for application of the sleeve. When the sleeve, and its nipple, have been removed from the plug, the door is closed, thus completely hiding the outlet from view, and preventing children from permitting the gas to escape. Should, however, the door be opened, and the stem pushed inwardly, the person so doing will smell the gas, and release pressure on the stem, with the result that the spring will immediately seat the valve and cut off the flow of gas. The other end of the T-joint is equipped in the same manner as the end just described, so that a gas outlet is provided for each of the adjoining rooms. The spring 20 serves to resiliently maintain the two valves against their seats. When not in use, the nipple is unscrewed from the plug and stored in a safe place, so that unauthorized persons cannot use same.

While we have described this device as used with gas fittings, we wish it understood that the same may be used, with equal facility and results, with water, either inside or outside of a building.

What is claimed is:

A gas outlet including a gas conduit, a T on an end of the conduit, a sleeve screwed into each of the lateral branches of the T and having the inner end of the bore thereof formed with a beveled seat, said sleeve having a radial pin outwardly of the branch of the T, a hollow stem slidable in the bore of each of the sleeves and having its outer end open and its inner end closed, said stem having lateral openings in its closed end and a peripheral beveled valve forming flange, seated on said seat, a coil spring disposed between the inner ends of the stems and having its ends encircling the said stems and bearing against said valve flanges whereby to yieldably maintain the flanges on the seats, the outer end of each of said sleeves being arranged to receive thereon a bayonet-slotted cap provided with a threaded portion for reception of a valved nipple.

In testimony whereof, we affix our signatures.

EDGAR W. HORTON.
HORACE G. RICHARDSON.